United States Patent
Sato et al.

(10) Patent No.: US 9,550,176 B2
(45) Date of Patent: Jan. 24, 2017

(54) EXHAUST GAS PURIFICATION CATALYST AND PRODUCTION METHOD THEREOF

(71) Applicant: MAZDA MOTOR CORPORATION, Hiroshima (JP)

(72) Inventors: Yoshiyuki Sato, Hiroshima (JP); Hiroshi Yamada, Hiroshima (JP); Koichiro Harada, Hiroshima (JP); Takashi Baba, Hiroshima (JP); Masahiko Shigetsu, Higashi-Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/430,514

(22) PCT Filed: Apr. 22, 2014

(86) PCT No.: PCT/JP2014/002268
§ 371 (c)(1),
(2) Date: Mar. 23, 2015

(87) PCT Pub. No.: WO2014/192219
PCT Pub. Date: Dec. 4, 2014

(65) Prior Publication Data
US 2016/0067690 A1     Mar. 10, 2016

(30) Foreign Application Priority Data

May 27, 2013 (JP) .................. 2013-111023

(51) Int. Cl.
*B01J 29/068* (2006.01)
*B01J 37/02* (2006.01)
(Continued)

(52) U.S. Cl.
CPC .............. *B01J 29/068* (2013.01); *B01D 53/94* (2013.01); *B01D 53/945* (2013.01); *B01J 23/63* (2013.01);
(Continued)

(58) Field of Classification Search
CPC ...... F01N 3/18; F01N 3/2828; F02D 41/0235; B01J 29/068; B01J 23/464; B01J 23/58; B01J 23/63; B01J 35/0006; B01J 35/023; B01J 35/04; B01J 37/0201; B01J 37/0244; B01J 37/0246; B01D 53/9468
See application file for complete search history.

(56) References Cited

U.S. PATENT DOCUMENTS 6,518,213 B1    2/2003  Yamamoto et al.
2006/0019824 A1  1/2006  Miyoshi et al.
(Continued)

FOREIGN PATENT DOCUMENTS

CN    102049254 A    5/2011
CN    102198399 A    9/2011
(Continued)

OTHER PUBLICATIONS

International Search Report; PCT/JP2014/002268; Aug. 5, 2014.

*Primary Examiner* — Melvin C Mayes
*Assistant Examiner* — Michael Forrest
(74) *Attorney, Agent, or Firm* — Studebaker & Brackett PC

(57) ABSTRACT

This catalyst includes a lower catalytic layer 2 having catalytic ability to oxidize HC and CO and an upper catalytic layer 3 having catalytic ability to reduce $NO_x$. The lower catalytic layer 2 contains Pt and Pd acting as catalytic metals, zeolite, a Ce-containing oxide, and activated alu-
(Continued)

mina, and the upper catalytic layer 3 contains activated alumina loading an Rh-doped Ce-containing oxide and an $NO_x$ storage material.

4 Claims, 6 Drawing Sheets

(51) Int. Cl.

| | | |
|---|---|---|
| *B01J 23/63* | (2006.01) | |
| *B01J 35/00* | (2006.01) | |
| *B01D 53/94* | (2006.01) | |
| *B01J 37/08* | (2006.01) | |
| *F01N 3/28* | (2006.01) | |
| *B01J 29/74* | (2006.01) | |
| *B01J 37/03* | (2006.01) | |
| *F01N 3/10* | (2006.01) | |
| *B01J 35/04* | (2006.01) | |

(52) U.S. Cl.
CPC ............ *B01J 29/74* (2013.01); *B01J 35/0006* (2013.01); *B01J 35/04* (2013.01); *B01J 37/02* (2013.01); *B01J 37/0201* (2013.01); *B01J 37/03* (2013.01); *B01J 37/08* (2013.01); *F01N 3/10* (2013.01); *F01N 3/28* (2013.01); *B01D 2255/1021* (2013.01); *B01D 2255/1023* (2013.01); *B01D 2255/1025* (2013.01); *B01D 2255/2065* (2013.01); *B01D 2255/2092* (2013.01); *B01D 2255/50* (2013.01); *B01D 2255/902* (2013.01); *B01D 2255/91* (2013.01); *B01D 2258/014* (2013.01); *F01N 2330/34* (2013.01); *F01N 2370/04* (2013.01); *Y02T 10/22* (2013.01)

(56) References Cited

U.S. PATENT DOCUMENTS

| | | | |
|---|---|---|---|
| 2008/0096759 | A1 | 4/2008 | Hori et al. |
| 2009/0239745 | A1* | 9/2009 | Yamato ................ B01D 53/944 502/339 |
| 2011/0045968 | A1* | 2/2011 | Akamine ............. B01D 53/945 502/303 |
| 2011/0107751 | A1 | 5/2011 | Akamine et al. |
| 2011/0237429 | A1 | 9/2011 | Akamine et al. |
| 2011/0305612 | A1* | 12/2011 | Muller-Stach ....... B01D 53/945 423/212 |

FOREIGN PATENT DOCUMENTS

| | | |
|---|---|---|
| JP | 2001-113173 A | 4/2001 |
| JP | 2004-169563 A | 6/2004 |
| JP | 2004-174490 A | 6/2004 |
| JP | 2004-209324 A | 7/2004 |
| JP | 2006-043541 A | 2/2006 |
| JP | 2006-346525 A | 12/2006 |
| JP | 2011-101842 A | 5/2011 |
| WO | 2006/046316 A1 | 5/2006 |

* cited by examiner

| Pt, Rh, NOX STORAGE MATERIAL, (Rh-DOPED Ce-CONTAINING OXIDE/ACTIVATED ALUMINA) | ~3 |
| (Pt, Pd/ZEOLITE, ACTIVATED ALUMINA, OSC MATERIAL) | ~2 |
| ///////////////////////////////////////// | ~1 |

EXHAUST GAS PURIFICATION CATALYST AND PRODUCTION METHOD THEREOF

TECHNICAL FIELD

The present invention relates to exhaust gas purification catalysts and a method for producing such catalysts.

BACKGROUND ART

An exhaust gas treatment system for diesel engines generally includes a diesel oxidation catalyst (DOC) and a diesel particulate filter (DPF) which is arranged downstream of the DOC. The DOC oxidizes and purifies hydrocarbon (HC) and carbon monoxide (CO) in exhaust gas, and oxidizes, among nitrogen oxides ($NO_x$), nitrogen monoxide (NO) into nitrogen dioxide ($NO_2$). The heat of catalytic reaction generated by the DOC increases the temperature of the DPF, and the high oxidizability of $NO_2$ promotes combustion of particulate matters (PMs) deposited on the DPF. Since activity of the DOC is low immediately after start-up of the engine, zeolite is provided for the DOC as an HC trapping material to prevent HC from being exhausted without being purified.

On the other hand, a lean NO trap catalyst (LNT catalyst) is also utilized in lean-burn gasoline engines or diesel engines to purify $NO_x$. An NO storage material in the LNT catalyst stores $NO_x$ when the air-fuel ratio of an exhaust gas is lean. A rich purge changes the air-fuel ratio in the engine to rich, and releases $NO_x$ and reduces $NO_x$ with unburned gas. An alkali metal or an alkali earth metal may be used as the $NO_x$ storage material. However, an alkali metal forms a glass phase on the grain boundaries of cordierite forming a catalyst substrate to reduce strength of the substrate. Therefore, an alkali earth metal is actually adopted in general, because it will not cause such a problem.

As disclosed in Patent Document 1, in an exhaust gas purification catalyst for gasoline engines which has been proposed, an HC adsorbent layer containing zeolite and a catalytic metal layer containing an $NO_x$ storage material are stacked one upon the other on a monolithic support. The catalytic metal layer contains Pd-loading alumina, Pd-loading cerium oxide, Rh-loading alumina, and Pt-loading alumina.

Regarding an LNT catalyst, Patent Document 2 teaches providing a lower layer containing activated alumina and CePr composite oxide (complex oxide) in mixture, and an upper layer containing Rh-loading alumina and Rh-doped CeZr composite oxide in mixture, and impregnating both of these layers with Pt, Rh, and an $NO_x$ storage material to load them into both of the two layers.

CITATION LIST

Patent Document

PATENT DOCUMENT 1: Japanese Unexamined Patent Publication No. 2001-113173
PATENT DOCUMENT 2: Japanese Unexamined Patent Publication No. 2006-43541

SUMMARY OF THE INVENTION

Technical Problem

The Rh-loading alumina disclosed in Patent Documents 1 and 2 is effective in reducing $NO_x$, and loading of Rh on the activated alumina causes Rh to disperse to an increased degree. However, the affinity of Rh for alumina is so high that subjection of the Rh-loading alumina to a high-temperature exhaust gas will bury Rh in activated alumina and will deactivate Rh, which is a problem. In addition, in an oxygen-rich atmosphere, Rh itself will be oxidized to reduce catalytic activity, which is also a problem.

The present invention overcomes the above problems to be caused when Rh is loaded on activated alumina in an exhaust gas purification catalyst including a lower catalytic layer having HC and CO oxidizability, and an upper catalytic layer having $NO_x$ reducibility to improve HC, CO, and $NO_x$ purification performance.

Solution to the Problem

In order to overcome these problems, according to the present invention, Rh is loaded on activated alumina while being doped into a Ce-containing oxide.

Specifically, an exhaust gas purification catalyst disclosed herein includes a lower catalytic layer having catalytic ability to oxidize HC and CO on a substrate, and an upper catalytic layer having catalytic ability to reduce $NO_x$ on top of, or above, the lower catalytic layer, wherein the lower catalytic layer contains Pt and Pd acting as catalytic metals, zeolite, a Ce-containing oxide, and activated alumina, and the upper catalytic layer contains activated alumina loading an Rh-doped Ce-containing oxide and an $NO_x$ storage material.

Here, the Rh-doped Ce-containing oxide is an oxide in which Rh is dissolved in a Ce-containing oxide (i.e., Rh is arranged between the crystal lattice points or lattice points of the Ce-containing oxide). The Ce-containing oxide may be either an oxide of ceria alone or a composite oxide including Ce and one, two or more other transition metals such as Zr, Pr, and Nd.

According to the exhaust gas purification catalyst, HC in the exhaust gas is adsorbed into zeolite in the lower catalytic layer when the catalyst temperature is low. As the catalyst temperature rises, the HC is released from zeolite, and oxidized and purified together with CO in the exhaust gas by Pt and Pd, of which the activity has increased with the rise in temperature. $NO_x$ stored in the $NO_x$ storage material at a lean air-fuel ratio of the exhaust gas is released when the air-fuel ratio reaches the vicinity of a theoretical air-fuel ratio or gets rich. Then, that $NO_x$ is reduced and purified by the Rh when leaving the upper catalytic layer.

Also, storage of $NO_x$ by the Ce-containing oxide of the lower catalytic layer increases the overall amount of $NO_x$ adsorbed and a water gas shift reaction via the Ce-containing oxide generates hydrogen serving as an $NO_x$ reducing agent to promote reduction of $NO_x$. Furthermore, when the air-fuel ratio is turned rich, the heat generated through reaction between the oxygen stored in the Ce-containing oxide and a reducing agent (HC and CO) promotes the activity of the catalyst, thereby increasing NO purification efficiency.

Rh is doped into the Ce-containing oxide. In other words, Rh is loaded on the activated alumina through the Ce-containing oxide. This prevents Rh from being buried in activated alumina even if the catalyst is exposed to a high-temperature exhaust gas. Meanwhile, the activated alumina is used as a material for supporting Rh-doped Ce-containing oxide. This activated alumina having a large specific surface area contributes to dispersing Rh to an increased degree, and works favorably to increase the catalyst activity effectively. In addition, the oxygen storage/ release ability of the Ce-containing oxide reduces oxidation of Rh, thus contributing greatly to maintaining the activity of the Rh.

In a preferred embodiment, the content of the zeolite is 70 g/L (amount per 1 L of the substrate) or more and 130 g/L or less, the content of the Ce-containing oxide is 20 g/L or more and 60 g/L or less, the content of the activated alumina is 40 g/L or more and 80 g/L or less, the content of the activated alumina on which Rh-doped Ce-containing oxide is loaded is 10 g/L or more and 30 g/L or less (the content of the Rh-doped Ce-containing oxide is 0.5 g/L or more and 5 g/L or less), and the content of the NO storage material loaded is 20 g/L or more and 60 g/L or less. A preferred content of the Pt loaded is 0.5 g/L or more and 2.5 g/L or less, a preferred content of the Pd loaded is 0.3 g/L or more and 1.3 g/L or less, and a preferred content of the Rh loaded is 0.2 g/L or more and 0.6 g/L or less.

In a preferred embodiment, the lower catalytic layer includes a first oxidation catalyst layer containing activated alumina loading Pt and Pd and a Ce-containing oxide loading Pt and Pd, and a second oxidation catalyst layer containing zeolite loading Pt and Pd, and the second oxidation catalyst layer is disposed on the first oxidation catalyst layer.

According to this embodiment, zeolite is disposed in the upper level. This structure can adsorb HC in the exhaust gas effectively, and can make Pt and Pd loaded on that zeolite purify efficiently HC that has desorbed itself from zeolite. In addition, loading Pt and Pd on the Ce-containing oxide allows a water gas shift reaction to advance more smoothly.

In a preferred embodiment, an intermediate catalytic layer is provided between the lower and upper catalytic layers, the intermediate catalytic layer containing Pt and Rh acting as catalytic metals, activated alumina, a Ce-containing oxide, and an $NO_x$ storage material, and containing no Pd. According to this embodiment, the intermediate catalytic layer stores and reduces $NO_x$. Besides, $NO_x$ released from the $NO_x$ storage material of the intermediate catalytic layer is reduced by the Rh-doped Ce-containing oxide when passing through the upper catalytic layer, and therefore, can be purified more easily. The intermediate catalytic layer contains no Pd, and a decrease in activity of Rh due to alloying between Pd and Rh can be avoided.

In a preferred embodiment, a substrate having a hexagonal cell honeycomb structure with a hexagonal cell cross section is adopted as the substrate. The hexagonal cell has a large angle (about 120 degrees) at a corner of the cell, and therefore, the degree of a local increase in the thickness of the catalytic layer on a corner of the cell can be reduced compared to a triangle cell or a quadrangular cell. That is, this structure contributes effectively to making the thickness of the catalytic layer more uniform, and allows the exhaust gas to contact the catalytic layer efficiently. This also means that it takes a decreased amount of the catalyst to achieve the intended catalytic effect. This not only cuts down the cost but also broadens the exhaust gas' passage through the cell, thus checking an increase in the back pressure of an engine (and a decrease in engine output) beneficially.

A method for producing an exhaust gas purification catalyst described herein includes forming, on a substrate, a lower catalytic layer including Pt and Pd acting as catalytic metals, zeolite, a Ce-containing oxide, and activated alumina, and forming, on the lower catalytic layer, an upper catalytic layer including activated alumina loading an Rh-doped Ce-containing oxide and an $NO_x$ storage material, wherein in the forming the upper catalytic layer, a mixture of a coprecipitated hydroxide containing Ce and Rh, and activated alumina is calcined to prepare the activated alumina loading the Rh-doped Ce-containing oxide, activated alumina loading the Rh-doped Ce-containing oxide is applied directly or indirectly onto the lower catalytic layer, and the applied layer is impregnated with the $NO_x$ storage material, and is calcined.

The method allows for obtaining an exhaust gas purification catalyst including a lower catalytic layer containing Pt and Pd acting as catalytic metals, zeolite, a Ce-containing oxide, and activated alumina, and an upper catalytic layer containing activated alumina loading an Rh-doped Ce-containing oxide, and an $NO_x$ storage material, and having high HC, CO, and $NO_x$ purification performance. The activated alumina loading an Rh-doped Ce-containing oxide of the upper catalytic layer has a larger surface area, and therefore, the upper catalytic layer is impregnated with and loaded with most of the $NO_x$ storage material to reduce the amount of the $NO_x$ storage material introduced into the lower catalytic layer. As a result, it is possible to reduce interaction between the $NO_x$ storage material and zeolite causing degradation in $NO_x$ storage performance and HC adsorption performance.

Advantages of the Invention

According to the exhaust gas purification catalyst of the present invention, Rh is doped into a Ce-containing oxide, and loaded on activated alumina through the Ce-containing oxide. Therefore, it is possible to prevent Rh from being buried in the activated alumina while dispersing the Rh to an increased degree using activated alumina. The lower catalytic layer having catalytic ability to oxidize HC and CO, and the upper catalytic layer having catalytic ability to reduce $NO_x$ will purify efficiently HC, CO, and $NO_x$ in exhaust gas.

The method for producing an exhaust gas purification catalyst according to the present invention allows for obtaining an exhaust gas purification catalyst including a lower catalytic layer containing Pt and Pd acting as catalytic metals, zeolite, a Ce-containing oxide, and activated alumina, and an upper catalytic layer containing activated alumina containing an Rh-doped Ce-containing oxide, and an $NO_x$ storage material, and having a high HC, CO, and $NO_x$ purification performance.

DESCRIPTION OF EMBODIMENTS

Embodiments of the present invention will now be described with reference to the drawings. Note that the following description of preferred embodiments is merely illustrative in nature, and is not intended to limit the scope, applications, and use of the present disclosure.

An exhaust gas purification catalyst described herein is suitable for purifying an exhaust gas of a diesel engine of an automobile, and disposed in an exhaust passage of the diesel engine. A DPF is disposed in the exhaust passage downstream of the exhaust gas purification catalyst.

Figures 1, 2:
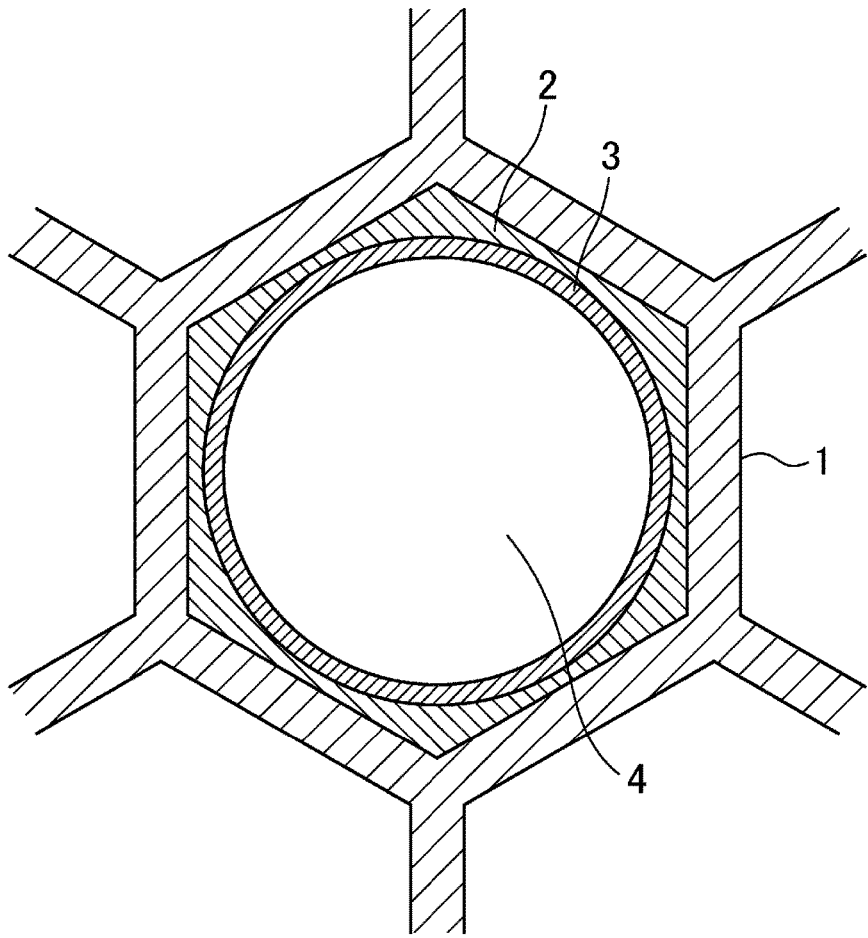
FIG. 1 is a cross-sectional view illustrating a portion of an exhaust gas purification catalyst.
FIG. 2 is a cross-sectional view illustrating how respective catalytic layers are stacked one upon the other in an exhaust gas purification catalyst according to a first embodiment.

FIG. 1 illustrates a basic configuration for the exhaust gas purification catalyst. In FIG. 1, the reference character 1 denotes the cell wall of a honeycomb substrate. A lower catalytic layer 2 is formed on the cell wall 1, and an upper catalytic layer 3 is formed on the lower catalytic layer 2. The space surrounded with the upper catalytic layer 3 serves as an exhaust gas passage 4. The honeycomb substrate has a hexagonal cell honeycomb structure with a hexagonal cell cross section. In FIG. 1, the catalytic layers 2 and 3 are illustrated as being provided for only one cell for the sake of simplicity. However, the catalytic layers 2 and 3 are actually provided for every cell.

As illustrated in FIG. 2, according to a first preferred embodiment, the lower catalytic layer 2 contains, as DOC components, zeolite loading Pt and Pd, activated alumina loading Pt and Pd, and an oxygen storage capacity (OSC) material loading Pt and Pd. The OSC material is made of a Ce-containing oxide. The lower catalytic layer 2 is implemented as a DOC layer. The upper catalytic layer 3 contains alumina loading an Rh-doped Ce-containing oxide (hereinafter referred to as "Rh-doped Ce-containing oxide-loading alumina") as an LNT catalytic component. Furthermore, Pt and Rh acting as LNT catalytic metals and an $NO_x$ storage material are loaded into the LNT catalytic component of the upper catalytic layer 3 by some impregnation method. The upper catalytic layer 3 is implemented as an LNT catalytic layer. Pt, Rh, and the $NO_x$ storage material (alkali earth metal) are partially loaded into the DOC components of the lower catalytic layer 2.

Figure 3:
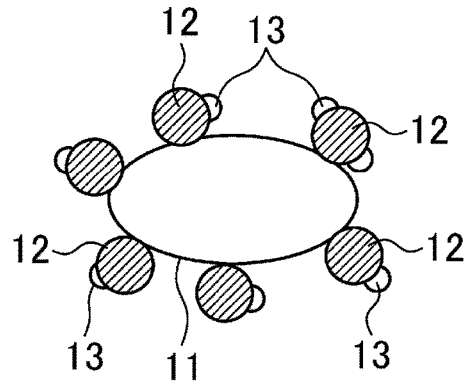
FIG. 3 is a schematic representation of alumina loading an Rh-doped Ce-containing oxide.

The Rh-doped Ce-containing oxide-loading alumina is a catalytic component loading an Rh-doped Ce-containing oxide 12 on activated alumina 11 as illustrated in FIG. 3, and Rh 13 is loaded on the activated alumina 11 through the Ce-containing oxide.

Figure 4:
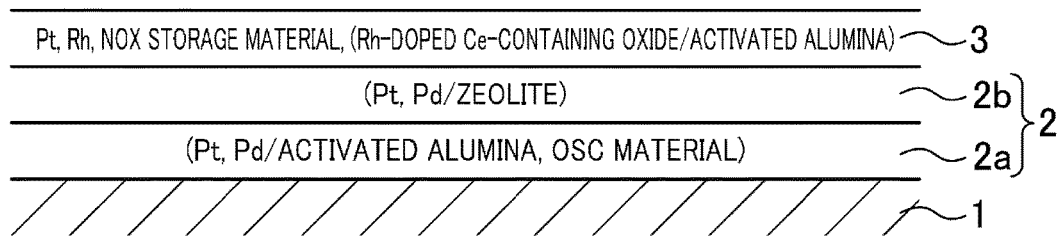
FIG. 4 is a cross-sectional view illustrating how respective catalytic layers are stacked one upon the other in an exhaust gas purification catalyst according to a second embodiment.

As illustrated in FIG. 4, according to a second preferred embodiment, although the upper catalytic layer 3 has the same configuration as its counterpart of the first embodiment, the lower catalytic layer 2 is comprised of a first oxidation catalyst layer 2a and a second oxidation catalyst layer 2b stacked on the first oxidation catalyst layer 2a. The first oxidation catalyst layer 2a contains, as DOC components, activated alumina loading Pt and Pd and an OSC material loading Pt and Pd. The second oxidation catalyst layer 2b contains zeolite loading Pt and Pd as a DOC component. The DOC components of the oxidation catalyst layers 2a and 2b are loaded with small amounts of Pt, Rh, and the $NO_x$ storage material.

Figure 5:
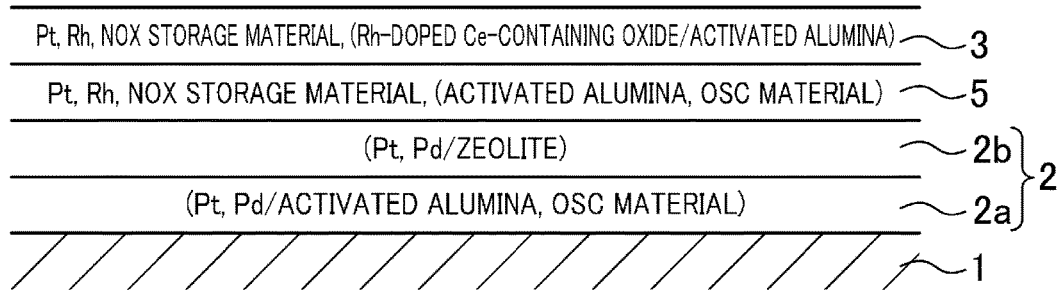
FIG. 5 is a cross-sectional view illustrating how respective catalytic layers are stacked one upon the other in an exhaust gas purification catalyst according to a third embodiment.

As illustrated in FIG. 5, according to a third preferred embodiment, although the lower catalytic layer 2 (comprised of the first and second oxidation catalyst layers 2a and 2b) and the upper catalytic layer 3 have the same configuration as their counterparts of the second embodiment, an intermediate catalytic layer 5 is interposed between the lower and upper catalytic layers 2 and 3. The intermediate catalytic layer 5 includes activated alumina and an OSC material, which are partially loaded with LNT catalytic metals (Pt, Rh) and $NO_x$ storage material introduced by the impregnation method mentioned above.

The intermediate catalytic layer 5 can also be provided between the lower catalytic layer 2 and the upper catalytic layer 3 when the lower catalytic layer 2 is formed by a single layer like the first embodiment.

(Method for Producing Exhaust Gas Purification Catalyst)

Figure 6:
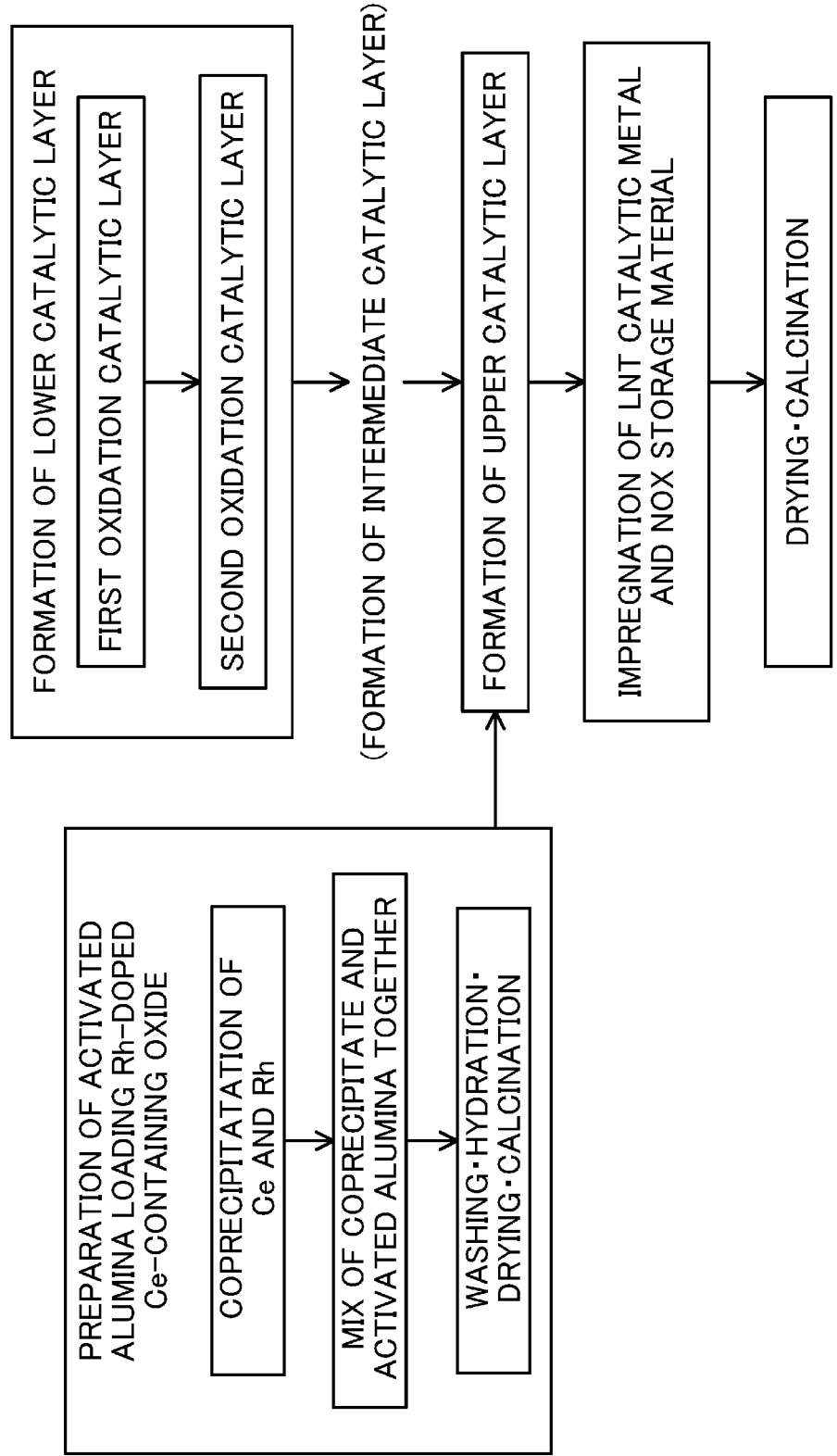
FIG. 6 is a flowchart showing respective process steps to be performed to produce an exhaust gas purification catalyst.

FIG. 6 shows respective manufacturing process steps to be performed to produce an exhaust gas purification catalyst.

[Formation of Lower Catalytic Layer 2]

A lower catalytic layer 2 is formed on a honeycomb substrate by applying slurry including a DOC powder and a binder to the honeycomb substrate, drying and then calcining the slurry. If the lower catalytic layer 2 has a double-layer structure comprised of the first and second oxidation catalyst layers 2a and 2b as in the second and third embodiments, slurry for the first oxidation catalyst layer is applied, dried, and calcined, and then, slurry for the second oxidation catalyst layer is applied, dried, and calcined.

—Preparation of DOC Powder—

If the lower catalytic layer 2 is a single layer as in the first embodiment, zeolite, activated alumina, and an OSC material are mixed together, and catalytic metals (Pt and Pd) to make a DOC are loaded on the mixture by evaporation to dryness method. Specifically, water is added to the mixture and the resulting mixture is stirred to prepare slurry mixture. While this slurry mixture is being stirred, a nitrate solution in which the catalytic metals are dissolved is dropped onto the slurry mixture. Then, the resulting slurry mixture is further stirred while being heated to vaporize the water completely. The resulting dried mixture is calcined in the air and then pulverized. As a result, a DOC powder is obtained (as a mixture of zeolite, activated alumina, and the OSC material each loading the catalytic metals to make the DOC).

If the lower catalytic layer 2 has a double-layer structure comprised of the first and second oxidation catalyst layers 2a and 2b as in the second and third embodiments, the catalytic metals to make the DOC are partially loaded on the mixture of the activated alumina and the OSC material by the evaporation to dryness method to obtain a DOC powder for the first oxidation catalyst layer. The rest of the catalytic metals to make the DOC is loaded on zeolite by the evaporation to dryness method to obtain a DOC powder for the second oxidation catalyst layer.

—Preparation of Slurry—

A slurry is obtained by mixing the DOC powder with a binder and water, adding a nitric acid aqueous solution for adjusting the viscosity of the slurry to the mixture, and stirring the resulting mixture.

[Formation of Intermediate Catalytic Layer 5]

If an intermediate catalytic layer 5 is formed as in the third embodiment, an applied layer to be the intermediate catalytic layer is formed by mixing activated alumina, an OSC material, a binder, and water together to prepare a slurry, applying the slurry onto the lower catalytic layer 2 on the honeycomb substrate, and drying and then calcining the slurry.

[Formation of Upper Catalytic Layer 3]

An applied layer to be the upper catalytic layer is formed by applying slurry containing a binder and an LNT catalytic powder (activated alumina loading an Rh-doped Ce-containing oxide) onto the lower catalytic layer 2 of the honeycomb substrate (or onto the intermediate catalytic layer 5 in the third embodiment), drying and then calcining the slurry.

—Preparation of LNT Catalytic Powder—

Cerium nitrate and rhodium nitrate are dissolved in deionized water and stirred. While this nitrate solution (acid solution) is stirred, ammonia water is added to the nitrate solution to allow neutralization of the nitrate solution. As a result, Ce and Rh are coprecipitated as a hydroxide (which produces a precursor of an Rh-doped Ce-containing oxide). In the neutralization, another alkaline solution such as caustic soda solution may be used instead of the ammonia water.

Activated alumina is added to the solution containing the coprecipitated hydroxide, and the resulting solution is stirred sufficiently. This solution is processed by a centrifuge to remove the supernatant liquid. Next, deionized water is further added to the solution, and the resulting solution is stirred and processed by the centrifuge, again. This dehydration and washing processes are repeated a required number of times. Such dehydration and washing processes remove the redundant basic solution. The gelatinous block thus obtained is dried, and then calcined and pulverized. In this manner, activated alumina loading an Rh-doped Ce-containing oxide is obtained.

If the Rh-doped Ce-containing oxide is obtained by coprecipitating Ce and Rh as described above, Ce oxide (ceria) is doped with Rh. In the step of preparing the nitrate solution, addition of a nitrate of any other transition metal such as Zr, Pr, or Nd can also produce an Rh-doped Ce-based composite oxide.

[Impregnation of LNT Catalytic Metal and $NO_x$ Storage Material]

The honeycomb substrate including the applied layer to be the upper catalytic layer is impregnated with a mixed solution of LNT catalytic metals (Pt and Rh) and an $NO_x$ storage material. This mixed solution is mainly introduced into the applied layer to be the upper catalytic layer, and is also partially introduced into the applied layer to be the intermediate catalytic layer or the lower catalytic layer 2.

[Drying and Calcination]

The honeycomb substrate in which the applied layer has been impregnated with the mixed solution is dried and calcined. As a result, formed is an upper catalytic layer 3 into which the LNT catalytic metals (Pt and Rh) and the $NO_x$ storage material are loaded as a result of the impregnation. In the third embodiment, formed is an intermediate catalytic layer 5 into which the LNT catalytic metals (Pt and Rh) and the $NO_x$ storage material are loaded as a result of the impregnation.

In the method for producing an exhaust gas purification catalyst described above, the substrate may be dried by maintaining the substrate in the air at a temperature of about 100° C.-250° C. for a predetermined time, for example. The substrate may be calcined by maintaining the substrate in the air at a temperature of about 400° C.-600° C. for a few hours, for example.

(Evaluation of HC Purification Performance and $NO_x$ Purification Performance)

Honeycomb catalysts were prepared as Examples 1-3 and Comparative Example by the method of producing an exhaust gas purification catalyst described above, and HC purification performance and $NO_x$ purification performance were evaluated. In each of Examples 1-3 and Comparative Example, a cordierite hexagonal-cell honeycomb substrate (with a diameter of 24.5 mm and a length of 50 mm) having a cell wall thickness of 4.5 mil ($1.143 \times 10^{-1}$ mm) and including 400 cells per square inch (645.16 mm²) was used as a substrate. A Ce—Pr composite oxide (with a mass ratio of $CeO_2:Pr_6O_{11}=90:10$) was used as an OSC material. β-zeolite was used as zeolite. The calcination during the catalytic powder preparation, the calcination after the application of the catalytic powder, and the calcination of the LNT catalytic metals and the $NO_x$ storage material after the impregnation were all performed in the air at a temperature of 500° C. for two hours.

EXAMPLE 1

Example 1 is a honeycomb catalyst such as the one illustrated in FIG. 2 according to the first embodiment. The amounts of the respective loaded catalytic components (i.e., "amount per 1 L of the substrate," as will be applied to the rest of the description) in the lower catalytic layer (single layer) 2 are zeolite=100 g/L, activated alumina=60 g/L, OSC material=40 g/L, Pt=1.6 g/L, and Pd=0.8 g/L. The LNT catalytic powder of the upper catalytic layer 3 is an Rh-doped Ce oxide-loading alumina containing 0.4 g/L of Rh, 2 g/L of $CeO_2$, and 18 g/L of activated alumina. The LNT catalytic metals introduced by the impregnation method are Pt and Rh, and the $NO_x$ storage materials are Ba and Sr. The amounts of the respective loaded components are Pt=4.3 g/L, Rh=0.1 g/L, Ba=30 g/L, and Sr=10 g/L.

EXAMPLE 2

Example 2 is a honeycomb catalyst such as the one illustrated in FIG. 4 according to the second embodiment. The amounts of the respective loaded catalytic components in the first oxidation catalyst layer 2a are activated alumina=60 g/L, OSC material=40 g/L, Pt=1.2 g/L, and Pd=0.6 g/L. The amounts of the respective loaded catalytic components in the second oxidation catalyst layer 2b are zeolite=100 g/L, Pt=0.4 g/L, and Pd=0.2 g/L. The upper catalytic layer 3 is made up of the same components as its counterpart of Example 1. The amounts of respective Pt and Rh introduced as LNT catalytic metals by the impregnation method, and the amounts of respective Ba and Sr introduced as $NO_x$ storage materials by the impregnation method are the same as those of Example 1.

EXAMPLE 3

Example 3 is a honeycomb catalyst such as the one illustrated in FIG. 5 according to the third embodiment. The amounts of the respective loaded catalytic components in the intermediate catalytic layer are activated alumina=40 g/L, and OSC material=40 g/L. The first oxidation catalyst layer 2a, the second oxidation catalyst layer 2b, and the upper catalytic layer 3 have the same components as their counterparts of Example 2. The amounts of respective Pt and Rh introduced as LNT catalytic metals by the impregnation method, and the amounts of respective Ba and Sr introduced as $NO_x$ storage materials by the impregnation method are the same as those of Example 1.

COMPARATIVE EXAMPLE

The comparative example is a honeycomb catalyst having the same configuration as Example 1, except that an Rh-loading alumina is adopted as the LNT catalytic powder of the upper catalytic layer. The Rh-loading alumina is obtained by loading Rh on activated alumina by the evaporation to dryness method, and contains 0.4 g/L of Rh, and 18 g/L of activated alumina.

—Measurement of HC Purification Rate—

The respective honeycomb catalysts of Example 1-3 and Comparative Example were subjected to an aging treatment in a gas atmosphere comprising 2% of $O_2$, 10% of $H_2O$, and $N_2$ as the balance at 800° C. for 24 hours. The honeycomb catalysts were loaded into a model gas flow reactor, and the gas temperature at a catalyst entrance was maintained at 100° C. with $N_2$ gas allowed to circulate through the honeycomb catalysts. Then, a model gas for evaluating the HC purification performance was introduced.

The model gas has a composition including 600 ppmC of n-octane, 150 ppmC of ethylene, 50 ppmC of propylene, 1500 ppm of CO, 30 ppm of NO, 10% of $O_2$, 10% of $H_2O$, and $N_2$ as the balance, and its space velocity was 72000/h.

Figure 7:
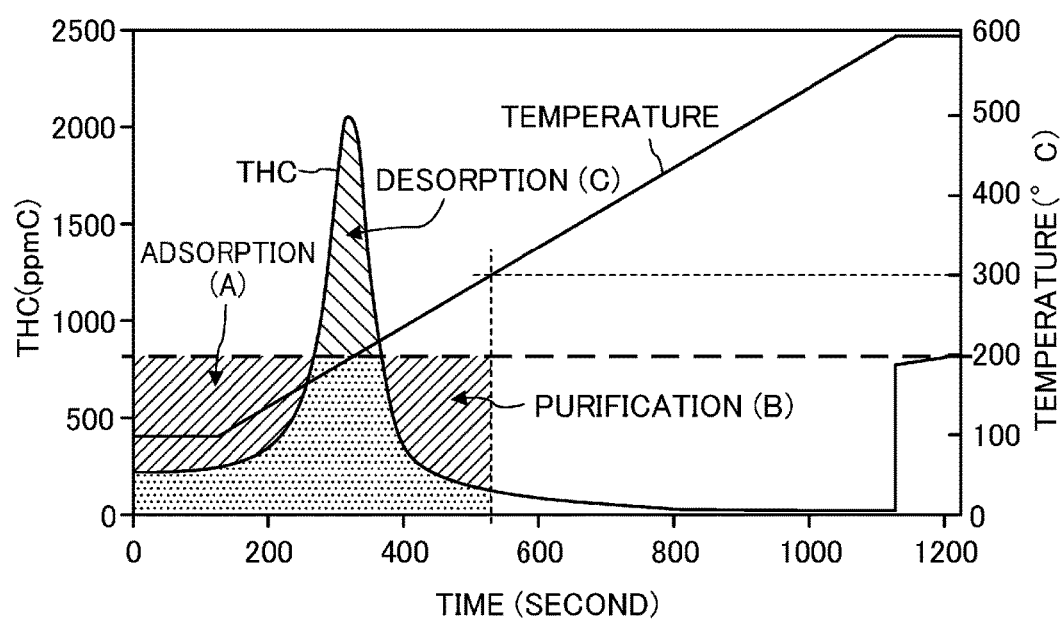
FIG. 7 is a graph showing how the total HC concentration of a gas emitted from the catalyst and a catalyst entrance temperature change during an HC purification performance evaluation test.

The gas temperature at the catalyst entrance started to be increased when two minutes passed since the model gas had started to be introduced, and a total HC concentration (THC) of the gas emitted from the honeycomb catalyst was measured. FIG. 7 shows an exemplary result of the measurement.

The temperature of the catalyst is low for a while after the model gas has started to be introduced, and therefore, HC in the model gas gets adsorbed on zeolite. Therefore, the THC of the emitted gas is lower than 800 ppmC that is the THC of the model gas. The amount of HC adsorbed on zeolite gradually decreases as the catalyst temperature rises. And when the gas temperature at the catalyst entrance reaches the vicinity of 200° C., the amount of HC desorbed exceeds the amount of HC adsorbed on zeolite, and the THC begins to rise steeply to be higher than 800 ppmC. The higher the catalyst temperature, the more and more active the catalyst gets to allow DOC to start purifying the desorbed HC. As a result, the THC falls steeply to be lower than 800 ppmC.

Figure 8:
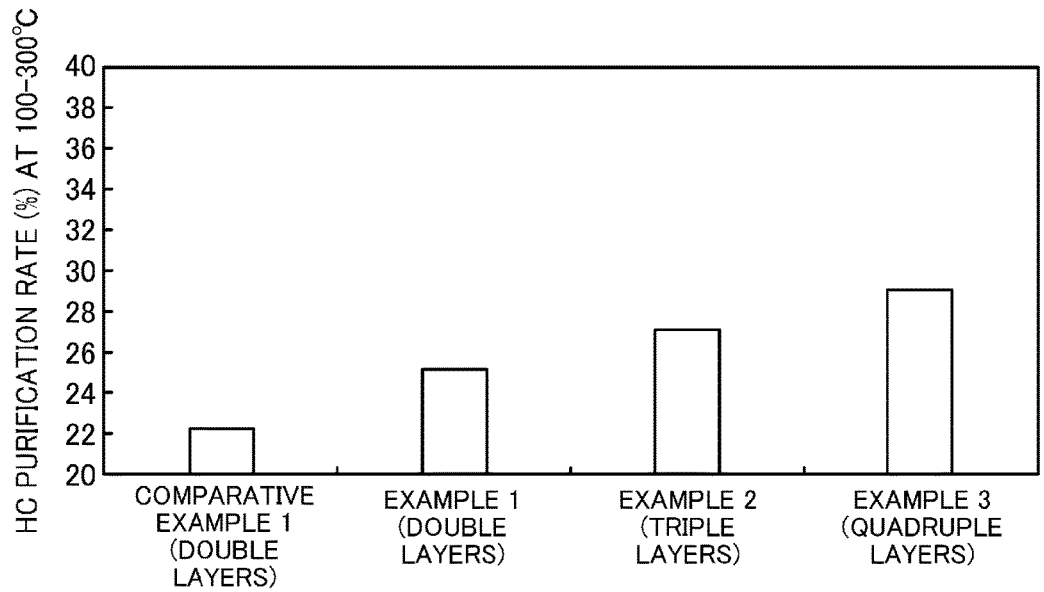
FIG. 8 is a graph showing HC purification rates in examples and a comparative example.

Then, the HC purification rate of each of the honeycomb catalysts of Examples 1-3 and Comparative Example was calculated for a period between a point in time when the model gas started to be introduced and a point in time when the gas temperature reached 300° C. Here, the HC purification rate was calculated by subtracting the amount of HC desorbed (C) from the sum of the decrease in THC (A) caused by the HC adsorption and the decrease in THC (B) caused by the HC purification as shown in FIG. 7. The results are shown in FIG. 8.

—Measurement of $NO_x$ Purification Rate—

The respective honeycomb catalysts of Examples 1-3 and Comparative Example were subjected to the same aging treatment as when the HC purification rate was measured, and then loaded into a model gas flow reactor. The gas temperature at a catalyst entrance was maintained at 200° C. with model gas with a rich air-fuel ratio allowed to circulate through the honeycomb catalyst. The gases were changed into a model gas with a lean air-fuel ratio with that temperature maintained, and the gases were changed once again into a model gas with a rich air-fuel ratio when 180 seconds passed since the model gases were changed.

Figure 9:
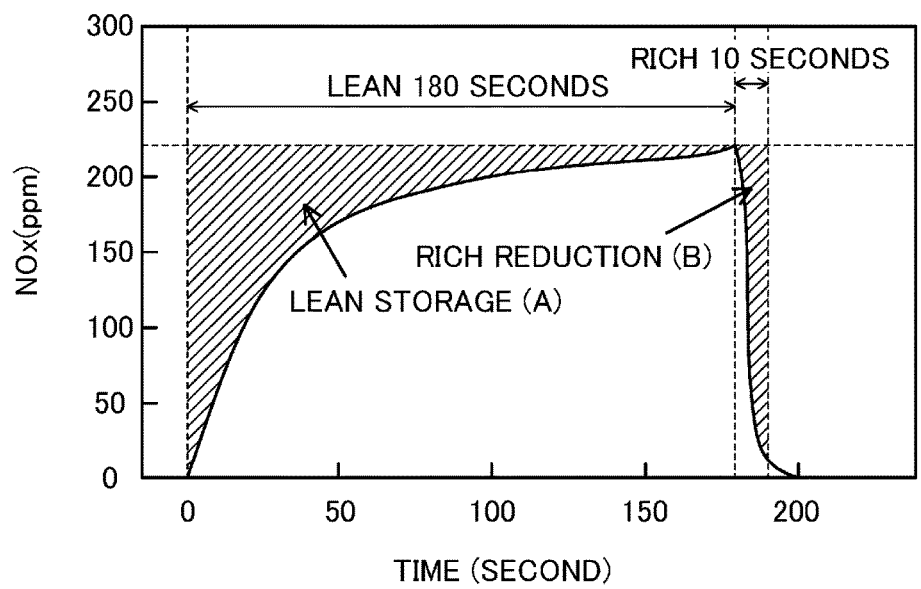
FIG. 9 is a graph showing how the $NO_x$ concentration of a gas emitted from the catalyst changes during an $NO_x$ purification performance evaluation test.

FIG. 9 shows an exemplary result of measurement of an $NO_x$ concentration of the gas emitted from the honeycomb catalyst. The $NO_x$ concentration starts to increase as soon as the types of the model gas are changed from rich to lean, and continues to rise with time after that. Then, as the $NO_x$ storage amount gets close to a saturation point, the $NO_x$ concentration of the model gas approaches 220 ppm asymptotically. When the type of the model gas is changed from lean to rich, $NO_x$ is released from the $NO_x$ storage material. However, since a reducing agent (HC and CO) is supplied due to the change into the rich type, $NO_x$ gets reduced by Pt and Rh at a steep rate. As a result, the $NO_x$ concentration of the emitted gas decreases steeply.

The $NO_x$ purification rate for 190 seconds in total was calculated based on the decrease in $NO_x$ (A) caused by $NO_x$ storage for 180 seconds in a lean state and the decrease in $NO_x$ (B) caused by $NO_x$ reduction for 10 seconds in a rich state as shown in FIG. 9. The average $NO_x$ purification rate for 190 seconds in total was calculated in the same way with the gas temperature at the catalyst entrance set to be 250° C.

The rich model gas has a composition including 220 ppm of NO, 3400 ppmC of HC, 1.0% of CO, 0.5% of $O_2$, 6% of $CO_2$, 10% of $H_2O$, and $N_2$ as the balance. The lean model gas has a composition including 220 ppm of NO, 400 ppmC of HC, 0.15% of CO, 10% of $O_2$, 6% of $CO_2$, 10% of $H_2O$, and $N_2$ as the balance. The results are shown in FIG. 10.

—Results of Measurement of HC Purification Ratio and $NO_x$ Purification Rate—

Figure 10:
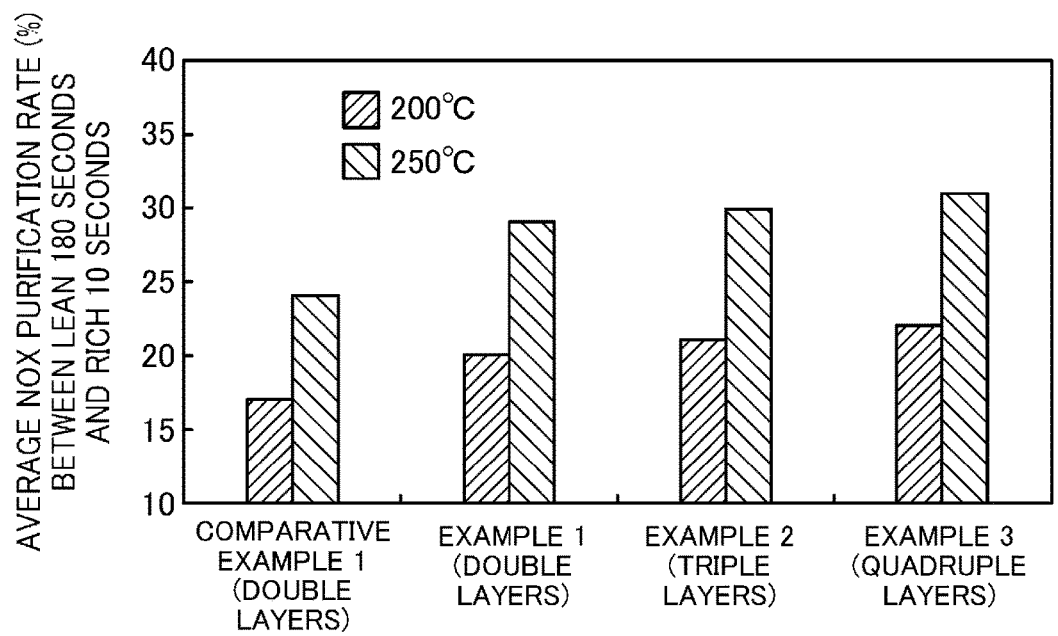
FIG. 10 is a graph showing $NO_x$ purification rates in the examples and the comparative example.

According to FIGS. 8 and 10, the HC purification rate and the $NO_x$ purification rate in Example 1 are larger than in the Comparative Example. This shows that use of an Rh-doped Ce-containing oxide-loading alumina as an LNT catalyst for the upper catalytic layer effectively improves purification performance of HC and $NO_x$.

That is probably because an Rh-doped Ce-containing oxide-loading alumina in Example 1 causes a smaller degree of degradation since the aging (at 800° C. for 24 hours) reduces burial of Rh in alumina, compared to the Rh-loading alumina of the Comparative Example. In addition, the increase in the $NO_x$ reduction activity of Rh caused by the Ce-containing oxide would also have led to the excellent result of Example 1.

Look at the results obtained in Examples 1-3, and it can be seen that Example 2 having a triple-layer structure has a higher HC purification rate and a higher $NO_x$ purification rate than Example 1 having a double-layer structure. This shows that it is preferable to dispose the lower catalytic layer 2 having a double-layer structure such that activated alumina and the OSC material are contained in the first oxidation catalyst layer 2a as the lower layer, and zeolite is contained in the second oxidation catalyst layer 2b as the upper layer. Example 3 having a quadruple-layer structure has an even higher HC purification rate and an even higher $NO_c$ purification rate than Example 2 having a triple-layer structure. This is probably because the multilayered structure reduces the amount of the LNT catalytic metal and the $NO_x$ storage material introduced into the lower catalytic layer 2.

DESCRIPTION OF REFERENCE CHARACTERS 1 substrate (cell wall)
2 lower catalytic layer
2a first oxidation catalyst layer
2b second oxidation catalyst layer
3 upper catalytic layer 5 intermediate catalytic layer
11 activated alumina
12 Rh-doped Ce-containing oxide
13 Rh

The invention claimed is:

1. An exhaust gas purification catalyst comprising:
   a lower catalytic layer having catalytic ability to oxidize HC and CO on a substrate; and
   an upper catalytic layer having catalytic ability to reduce $NO_x$ on top of, or above, the lower catalytic layer, wherein
   the lower catalytic layer contains Pt and Pd acting as catalytic metals, zeolite, Ce-containing oxide, and activated alumina,
   the upper catalytic layer contains activated alumina loading an Rh-doped Ce-containing oxide and an alkali earth metal acting as an $NO_x$ storage material,
   the lower catalytic layer includes a first oxidation catalyst layer containing activated alumina loading Pt and Pd and a Ce-containing oxide loading Pt and Pd, and a second oxidation catalyst layer containing zeolite loading Pt and Pd, and
   the second oxidation catalyst layer is disposed on the first oxidation catalyst layer.

2. The exhaust gas purification catalyst of claim 1, wherein
   an intermediate catalytic layer is provided between the lower and upper catalytic layers, the intermediate catalytic layer containing Pt and Rh acting as catalytic metals, activated alumina, a Ce-containing oxide and an NOx storage material, and containing no Pd.

3. The exhaust gas purification catalyst of claim 1, wherein
   the substrate has a hexagonal cell honeycomb structure with a hexagonal cell cross section.

4. A method for producing an exhaust gas purification catalyst, the method comprising:
   forming, on a substrate, a lower catalytic layer including Pt and Pd acting as catalytic metals, zeolite, a Ce-containing oxide, and activated alumina; and
   forming, on the lower catalytic layer, an upper catalytic layer including activated alumina loading an Rh-doped Ce-containing oxide and an alkali earth metal acting as an $NO_x$ storage material, wherein
   in the forming the upper catalytic layer,
   a mixture of a coprecipitated hydroxide containing Ce and Rh, and activated alumina is calcined to prepare the activated alumina loading the Rh-doped Ce-containing oxide, the activated alumina loading the Rh-doped Ce-containing oxide is applied directly or indirectly onto the lower catalytic layer,
   the applied layer is impregnated with the $NO_x$ storage material, and is calcined, and
   in the forming the lower catalytic layer,
   a first oxidation catalyst layer containing activated alumina loading Pt and Pd and a Ce-containing oxide loading Pt and Pd is formed on the substrate, and
   a second oxidation catalyst layer containing zeolite loading Pt and Pd is formed on the first oxidation catalyst layer.

* * * * *